(12) United States Patent
Li et al.

(10) Patent No.: US 10,274,766 B2
(45) Date of Patent: Apr. 30, 2019

(54) DRIVING CIRCUIT FOR DISPLAY PANEL COMPRISING A PLURALITY OF DISPLAY AREAS, AND DISPLAY APPARATUS

(71) Applicant: Boe Technology Group Co., Ltd., Beijing (CN)

(72) Inventors: Shou Li, Beijing (CN); Yaoqiu Jing, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 16 days.

(21) Appl. No.: 15/521,362

(22) PCT Filed: Oct. 17, 2016

(86) PCT No.: PCT/CN2016/102259
§ 371 (c)(1),
(2) Date: Apr. 24, 2017

(87) PCT Pub. No.: WO2017/071492
PCT Pub. Date: May 4, 2017

(65) Prior Publication Data
US 2017/0329165 A1 Nov. 16, 2017

(30) Foreign Application Priority Data
Oct. 30, 2015 (CN) .......................... 2015 1 0721411

(51) Int. Cl.
*G09G 3/36* (2006.01)
*G02F 1/133* (2006.01)
(Continued)

(52) U.S. Cl.
CPC ........ *G02F 1/13306* (2013.01); *G02F 1/0123* (2013.01); *G02F 1/13452* (2013.01);
(Continued)

(58) Field of Classification Search
None
See application file for complete search history.

(56) References Cited

U.S. PATENT DOCUMENTS

| 2003/0169248 A1* | 9/2003 | Kim ..................... G09G 3/3611 345/204 |
| 2006/0164366 A1* | 7/2006 | Yu ........................ G09G 3/3648 345/98 |

(Continued)

FOREIGN PATENT DOCUMENTS

| CN | 101350180 A | 1/2009 |
| CN | 101656057 A | 2/2010 |

(Continued)

OTHER PUBLICATIONS

First Office Action for Chinese Patent Application No. 201510721411.4 dated Apr. 26, 2017.
(Continued)

*Primary Examiner* — Abdul-Samad A Adediran
*Assistant Examiner* — Kirk W Hermann
(74) *Attorney, Agent, or Firm* — Calfee, Halter & Griswold LLP (57) ABSTRACT

A driving circuit for a display panel is provided as well as a display apparatus. The driving circuit includes a plurality of timing controllers, a plurality of source drivers and a gamma voltage generation circuit. The gamma voltage generation circuit is used to supply a plurality of gamma voltages to each of the plurality of source drivers. The display apparatus includes the driving circuit.

15 Claims, 5 Drawing Sheets

(51) Int. Cl.
*G02F 1/01* (2006.01)
*G02F 1/1345* (2006.01)

(52) U.S. Cl.
CPC ............ *G09G 3/36* (2013.01); *G09G 3/3666* (2013.01); *G09G 3/3696* (2013.01); *G02F 2203/30* (2013.01); *G09G 2310/08* (2013.01); *G09G 2320/0233* (2013.01); *G09G 2320/0276* (2013.01)

(56) References Cited

U.S. PATENT DOCUMENTS

| | | | |
|---|---|---|---|
| 2009/0021507 A1* | 1/2009 | Bae | G09G 3/3666 345/212 |
| 2010/0045588 A1 | 2/2010 | Lee et al. | |
| 2010/0220043 A1 | 9/2010 | Brougton et al. | |
| 2012/0081626 A1 | 4/2012 | Itoh et al. | |
| 2012/0127145 A1 | 5/2012 | Jang et al. | |
| 2012/0182280 A1 | 7/2012 | Park | |
| 2013/0207944 A1 | 8/2013 | Oohira et al. | |
| 2014/0353672 A1 | 12/2014 | Choi et al. | |
| 2014/0353690 A1 | 12/2014 | Choi et al. | |
| 2015/0109190 A1 | 4/2015 | Li et al. | |
| 2015/0187321 A1 | 7/2015 | Kim et al. | |
| 2015/0206502 A1 | 7/2015 | Hwang et al. | |
| 2015/0348492 A1* | 12/2015 | Park | G09G 3/3666 345/205 |
| 2016/0291417 A1 | 10/2016 | Choi et al. | |

FOREIGN PATENT DOCUMENTS

| | | |
|---|---|---|
| CN | 102479480 A | 5/2012 |
| CN | 102804047 A | 11/2012 |
| CN | 103247272 A | 8/2013 |
| CN | 103293811 A | 9/2013 |
| CN | 103309095 A | 9/2013 |
| CN | 103439840 A | 12/2013 |
| CN | 203405655 A | 1/2014 |
| CN | 104252839 A | 12/2014 |
| CN | 104751762 A | 7/2015 |
| CN | 104795031 A | 7/2015 |
| CN | 105161070 A | 12/2015 |
| CN | 105278180 A | 1/2016 |
| CN | 205069086 U | 3/2016 |
| CN | 205080343 U | 3/2016 |
| WO | 2009057417 A1 | 5/2009 |

OTHER PUBLICATIONS

Search Report for International Patent Application No. PCT/CN2016/102259 dated Jan. 26, 2017.
Second Office Action for Chinese Patent Application No. 201510721411.4 dated Dec. 20, 2017.
Search Report for International Patent Application No. PCT/CN/2016/102261 dated Jan. 18, 2017.
Third Office Action for Chinese Patent Application No. 201510721411.4 dated Jun. 1, 2018.

* cited by examiner

DRIVING CIRCUIT FOR DISPLAY PANEL COMPRISING A PLURALITY OF DISPLAY AREAS, AND DISPLAY APPARATUS

CROSS-REFERENCE TO RELATED APPLICATIONS

The present application is the U.S. national phase entry of PCT/CN2016/102259, with an international filing date of Oct. 17, 2016, which claims the benefit of Chinese Patent Application No. 201510721411.4, filed on Oct. 30, 2015, the entire disclosures of which are incorporated herein by reference.

TECHNICAL FIELD

The present disclosure relates to the field of display technologies, and particularly to a driving circuit for a display panel and a display apparatus.

BACKGROUND

Display panels, such as liquid crystal displays and organic light-emitting diode displays, are widely used in electronic devices. The display panel has been designed with a larger size to meet various requirements. In general, a large-sized display panel is "virtually" divided into multiple sub-regions such that the sub-regions may be driven by multiple driving circuits, respectively.

Figure 1:
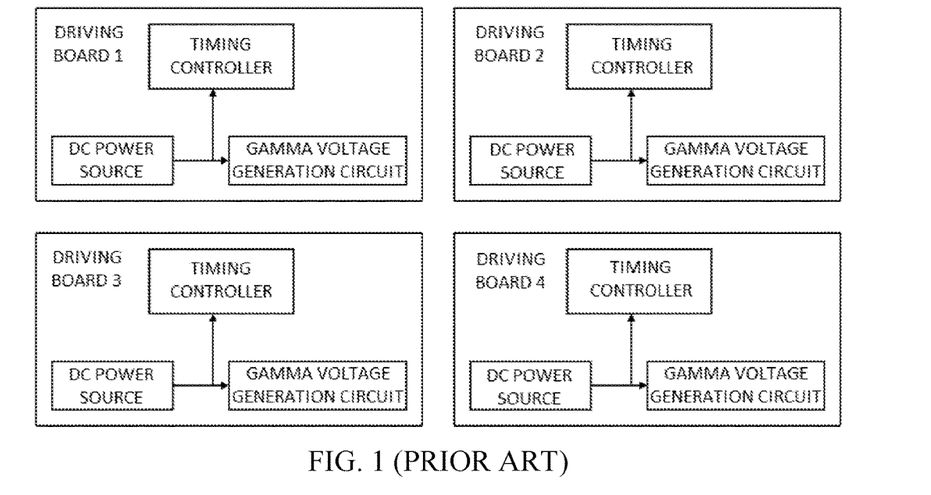
FIG. 1 schematically illustrates a block diagram of a driving circuit for a display panel that is divided into 2×2 sub-regions.

FIG. 1 schematically illustrates a block diagram of a driving circuit for a display panel that is divided into 2×2 sub-regions. In this case, four driving circuit boards are employed, each of which has an individual gamma voltage generation circuit. Inconsistency between gamma voltages generated by different gamma voltage generation circuits may lead to luminance differences among the four sub-regions at the same grayscale, which in turn causes non-uniformity of grayscales (known as "mura").

SUMMARY

It would be advantageous to provide a driving circuit for a display panel, which may alleviate, mitigate or eliminate at least one of the problems arising from the use of individual driving circuits as described above. It would also be desirable to provide a display apparatus including such a driving circuit.

According to an aspect of the present disclosure, a driving circuit for a display panel is provided. The display panel comprises a plurality of display areas. The driving circuit comprises: a plurality of source drivers each configured to generate and supply grayscale voltages to a respective one of the plurality of display areas, the grayscale voltages being generated by use of a plurality of gamma voltages as reference voltages; a plurality of timing controllers each configured to control a respective one of the plurality of source drivers to generate and supply respective grayscale voltages; and a gamma voltage generation circuit configured to supply the plurality of gamma voltages to at least two of the plurality of source drivers.

In some embodiments, the driving circuit further comprises a first direct current (DC) power source for supplying power to the gamma voltage generation circuit.

In some embodiments, the gamma voltage generation circuit comprises a digital circuit portion and an analog circuit portion, and the first DC power source comprises a single DC/DC converter for supplying DC voltages to both the digital circuit portion and the analog circuit portion of the gamma voltage generation circuit.

In some embodiments, the first DC power source comprises two DC/DC converters, one of which used for supplying a DC voltage to the digital circuit portion of the gamma voltage generation circuit, the other one of which used for supplying a DC voltage to the analog circuit portion of the gamma voltage generation circuit.

In some embodiments, the driving circuit further comprises at least one second DC power source for supplying power to the plurality of timing controllers.

In some embodiments, each of the plurality of timing controllers is powered by a respective one of the at least one second DC power source.

In some embodiments, at least two of the plurality of timing controllers are powered by one of the at least one second DC power source.

In some embodiments, the at least one second DC power source is further used for supplying power to the plurality of source drivers.

In some embodiments, each of the plurality of source drivers comprises a digital circuit portion and an analog circuit portion, and each of the at least one second DC power source comprises a single DC/DC converter for supplying DC voltages to a respective one or more of the plurality of timing controllers and both the digital circuit portion and the analog circuit portion of a respective one or more of the plurality of source drivers.

In some embodiments, each of the plurality of source drivers comprises a digital circuit portion and an analog circuit portion, and each of the at least one second DC power source comprises two DC/DC converters, one of which used for supplying DC voltages to a respective one or more of the plurality of timing controllers and the digital circuit portion of a respective one or more of the plurality of source drivers, the other one of which used for supplying a DC voltage to the analog circuit portion of a respective one or more of the plurality of source drivers.

According to another aspect of the present disclosure, a display apparatus is provided which comprises the driving circuit as described above.

These and other aspects of the present disclosure will be apparent from and elucidated with reference to the embodiment(s) described hereinafter.

DETAILED DESCRIPTION

Embodiments of the present disclosure will be described below in detail with reference to the accompanying drawings.

Figure 2:
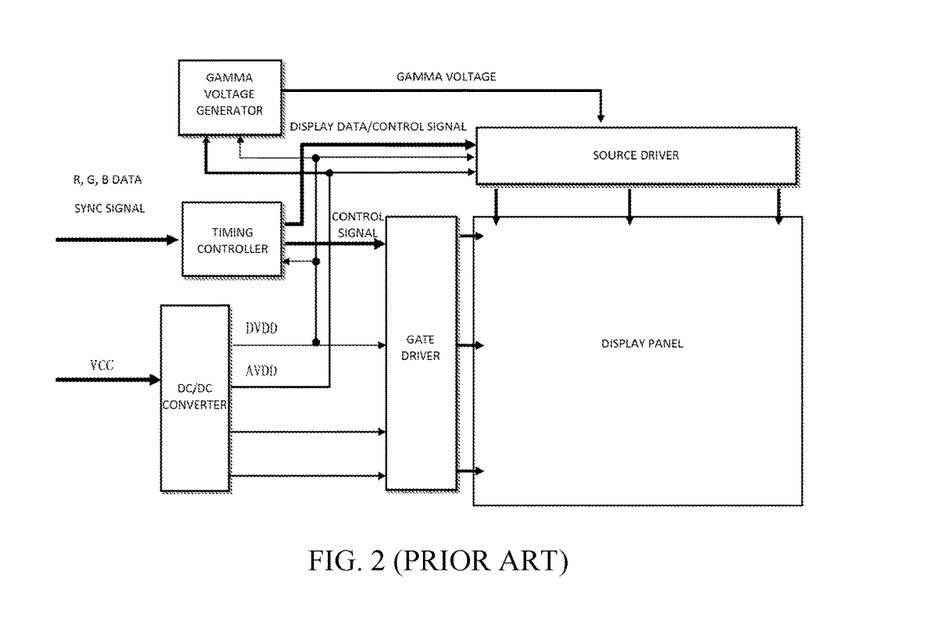
FIG. 2 schematically illustrates a block diagram of a general driving circuit for a display panel.

Reference is made to FIG. 2 to provide a better understanding of the present disclosure before detailing the embodiments of the present disclosure.

FIG. 2 schematically illustrates a block diagram of a general driving circuit for a display panel. As is show in the figure, a timing controller (TCON) supplies control signals to a gate driver and a source driver, and further supplies display data signals to the source driver. A gamma voltage generation circuit supplies gamma voltages to the source driver, which uses the gamma voltages as reference voltages to convert the display data signals into corresponding grayscale voltages. In the case that the display panel is a liquid crystal display, the grayscale voltages are supplied to the pixel units in the display panel for control of deflection angles of the liquid crystals, thus achieving display of an image. As a direct current (DC) power source of this driving circuit, a DC/DC converter supplies DC work voltages to the timing controller, the gate driver, the source driver and the gamma voltage generation circuit. In particular, since the gamma voltage generation circuit and the source driver each include a digital circuit portion and an analog circuit portion, the DC/DC converter may supply a DC power (DVDD) for the digital circuit and a DC power (AVDD) for the analog circuit. The driving circuit for a display panel as shown in FIG. 2 is known in the art, and will not be described here in detail.

Figure 3:
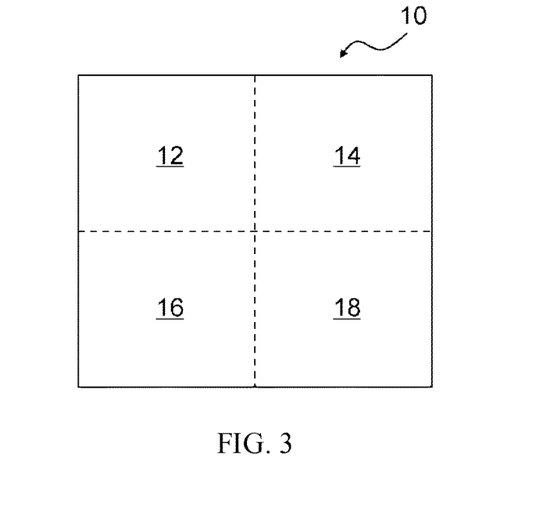
FIG. 3 schematically illustrates a block diagram of a display panel that includes multiple display areas.

FIG. 3 schematically illustrates a block diagram of a display panel 10 that includes multiple display areas. Referring to FIG. 3, the display panel 10 is divided into 2×2 display areas 12, 14, 16 and 18. It is to be understood that the number of the display areas included in the display panel 10 is illustrative, and that more or less display areas may be included.

Figure 4:
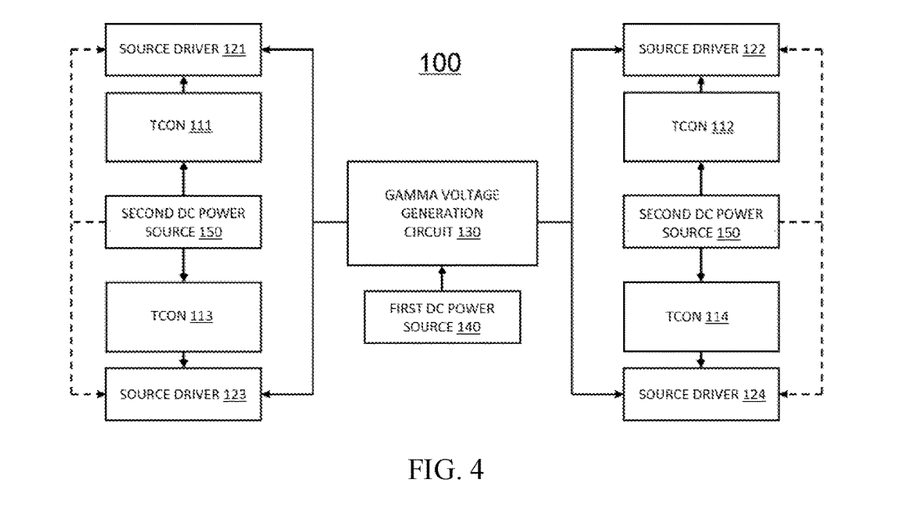
FIG. 4 schematically illustrates a block diagram of a driving circuit for the display panel of FIG. 3 according to an embodiment of the present disclosure.

FIG. 4 schematically illustrates a block diagram of a driving circuit 100 for the display panel 10 of FIG. 3 according to an embodiment of the present disclosure. Referring to FIG. 4, the display circuit 100 includes a plurality of timing controllers 111, 112, 113, 114, a plurality of source drivers 121, 122, 123, 124, and a gamma voltage generation circuit 130.

Each of the plurality of source drivers 121, 122, 123, 124 is configured to generate and supply grayscale voltages to a respective one of the plurality of display areas 12, 14, 16, 18. Specifically, each of the plurality of source drivers 121, 122, 123, 124 generates grayscale voltages corresponding to the display data signals in response to a timing control signal. For example, the source driver 121 is configured to supply grayscale voltages to the display area 12, the source driver 122 is configured to supply grayscale voltages to the display area 14, the source driver 123 is configured to supply grayscale voltages to the display area 16, and the source driver 124 is configured to supply grayscale voltages to the display area 18. The grayscale voltages are generated by use of a plurality of gamma voltages as reference voltages Each of the plurality of timing controllers 111, 112, 113, 114 is configured to control a respective one of the plurality of source drivers 121, 122, 123, 124 to generate and supply respective grayscale voltages. Specifically, each of the timing controllers 111, 112, 113, 114 supplies the timing control signal and the display data signals to a respective one of the plurality of source drivers 121, 122, 123, 124.

The gamma voltage generation circuit 130 is configured to supply the plurality of gamma voltages to at least two of the plurality of source drivers 121, 122, 123, 124.

By means of sharing the gamma voltages between at least two source drivers, the uniformity of grayscales among the display areas driven by these source drivers may be improved.

In this example, the display panel 10 includes four display areas 12, 14, 16, 18. Thus, the driving circuit 100 is illustrated as including four timing controllers and four source drivers. In particular, the driving circuit 100 includes only a single gamma voltage generation circuit 130, which supplies a plurality of gamma voltages to each of the source drivers 121, 122, 123, 124 in the driving circuit 100. As described above, the plurality of gamma voltages are used as reference voltages for conversion of the display data signals into corresponding grayscale voltages. In this example, all the source drivers 121, 122, 123, 124 may be kept in consistency when converting the display data since they use the same reference voltages. In other words, the same display data will be converted into the same grayscale voltage. This way, the non-uniformity of the grayscales among individual display areas may be avoided that is due to inconsistency of the reference voltages.

Further, the driving circuit 100 includes a separate first DC power source 140 for supplying power to the gamma voltage generation circuit 130. The gamma voltage generation circuit 130 generates the gamma voltages based on the power source voltage provided by the first DC power source 140. Since the first DC power source 140 is dedicated to powering the gamma voltage generation circuit 130, influence of operation of other circuits on the power source voltage (e.g., voltage ripples etc.) may be avoided, improving the stability of the resultant gamma voltages. The DC power source may be implemented with a DC/DC converter.

Figure 5:
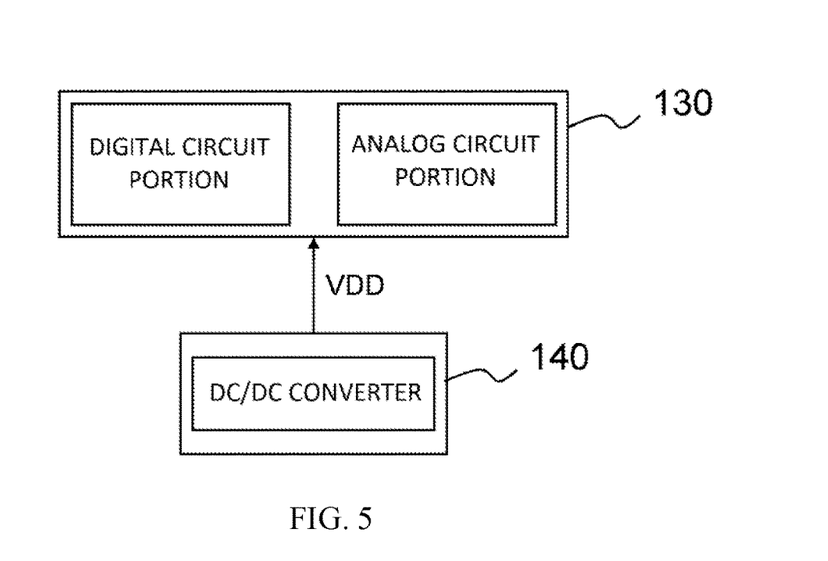
FIG. 5 is a block diagram showing an embodiment where a gamma voltage generation circuit is powered by a first DC power source including a single DC/DC converter.

FIG. 5 is a block diagram showing an embodiment where a gamma voltage generation circuit is powered by a first DC power source including a single DC/DC converter. As is known, the gamma voltage generation circuit includes a digital circuit portion and an analog circuit portion. The first DC power source 140 includes a single DC/DC converter. This single DC/DC converter supplies DC voltages VDD to both the digital circuit portion and the analog circuit portion of the gamma voltage generation circuit 130.

Figure 6:
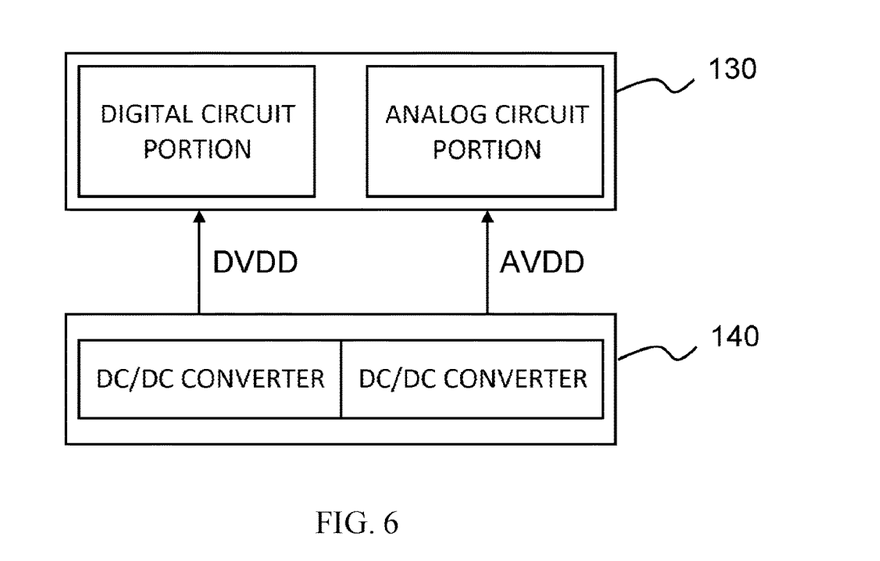
FIG. 6 is a block diagram showing an embodiment where a gamma voltage generation circuit is powered by a first DC power source including two DC/DC converters.

FIG. 6 is a block diagram showing an embodiment where a gamma voltage generation circuit is powered by a first DC power source including two DC/DC converters. The first DC power source 140 includes two DC/DC converters. One DC/DC converter supplies a DC voltage DVDD to the digital circuit portion of the gamma voltage generation circuit 130, and the other DC/DC converter supplies a DC voltage AVDD to the analog circuit portion of the gamma voltage generation circuit 130. It is advantageous to separate the power source of the digital circuit from that of the analog circuit because the switching of digital signals may introduce noises into the analog circuit.

Referring back to FIG. 4, the driving circuit 100 further includes at least one second DC power source 150 that is different from the first DC power source 140. The at least one second DC power source 150 may supply power to the plurality of timing controllers 111, 112, 113, 114. At least two of the plurality of timing controller 111, 112, 113, 114 may be powered by the same second DC power source 150. In the example shown in FIG. 4, the timing controllers 111 and 113 are powered by the left second DC power source 150, and the timing controllers 112 and 114 are powered by the right second DC power source 150. Where possible, the plurality of timing controllers 111, 112, 113, 114 may even be centrally powered by a single second DC power source 150. This may be advantageous because non-synchronization of the timing controllers may be caused, for example, due to the difference in the power-on time arising from a layout of the circuit etc., if different DC power sources are otherwise used to supply power to different timing controllers.

Figure 7:
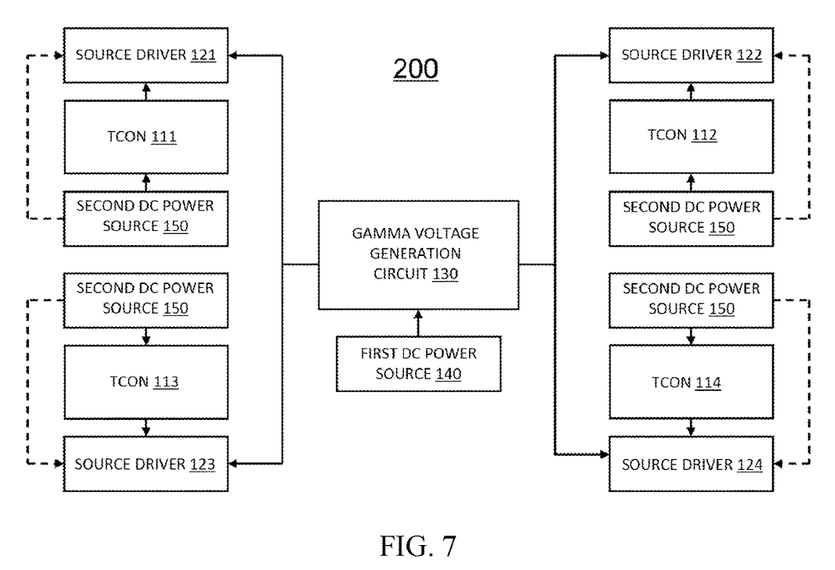
FIG. 7 schematically illustrates a block diagram of a driving circuit for the display panel of FIG. 3 according to an embodiment of the present disclosure.

FIG. 7 schematically illustrates a block diagram of a driving circuit 200 for the display panel 10 of FIG. 3 according to an embodiment of the present disclosure. As compare with the embodiment of FIG. 4, the driving circuit 200 includes four second DC power sources 150. Each of the plurality of timing controllers 111, 112, 113, 114 is powered by a respective second DC power source 150. This is advantageous in terms of circuit layout for example, because each timing controller may now be powered by a corresponding second DC power source 150 arranged close thereto.

In addition, as indicated by the dashed lines in FIGS. 4 and 7, the at least one second DC power source 150 may also supply power to the plurality of source drivers 121, 122, 123, 124.

Figure 8:
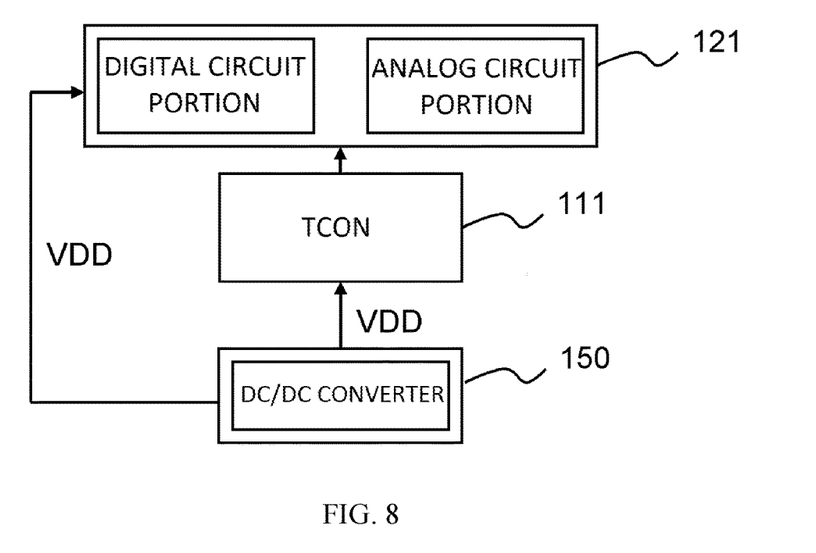
FIG. 8 is a block diagram showing an embodiment where a timing controller and a source driver are powered by a second DC power source including a single DC/DC converter.

FIG. 8 is a block diagram showing an embodiment where a timing controller and a source driver are powered by a second DC power source including a single DC/DC converter. For ease of illustration, only a timing controller 111, a source driver 121 and a corresponding second DC power source 150 are shown. As in known, the source driver includes a digital circuit portion and an analog circuit portion. The second DC power source 150 includes a single DC/DC converter for supplying DC voltages to the timing controller 111 and both the digital circuit portion and the analog circuit portion of the source drivers 121. Although not shown, this single DC/DC converter may be used to supply DC voltages VDD to more than one timing controller and more than one source driver.

Figure 9:
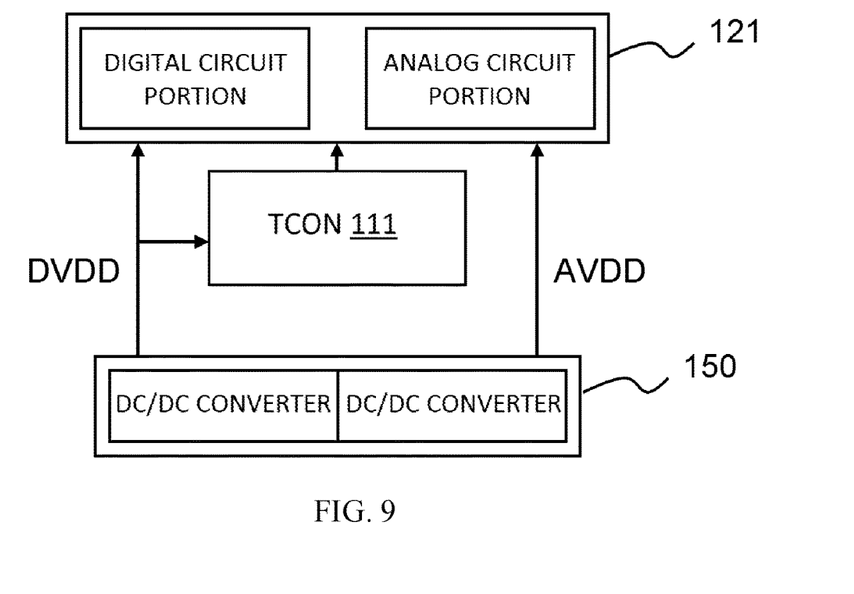
FIG. 9 is a block diagram showing an embodiment where a timing controller and a source driver are powered by a second DC power source including two DC/DC converters.

FIG. 9 is a block diagram showing an embodiment where a timing controller and a source driver are powered by a second DC power source including two DC/DC converters. For ease of illustration, only a timing controller 111, a source driver 121 and a corresponding second DC power source 150 are shown. The second DC power source 150 includes two DC/DC converters, one of which is used for supplying a DC voltage DVDD to the timing controller 111 and the digital circuit portion of the source drivers 121. Although not shown, this DC/DC converter may be used to supply the DC voltage DVDD to more than one timing controller and the digital circuit portion of more than one source driver. The other DC/DC converter is used for supplying a DC voltage AVDD to the analog circuit portion of the source driver 121. Although not shown, this DC/DC converter may be used to supply the DC voltage AVDD to the analog circuit portion of more than one source driver.

It should be understood that the number of the DC/DC converters included in the first DC power source 140 and the second DC power source 150 is illustrative, and that more DC/DC converters may be included.

Figure 10:
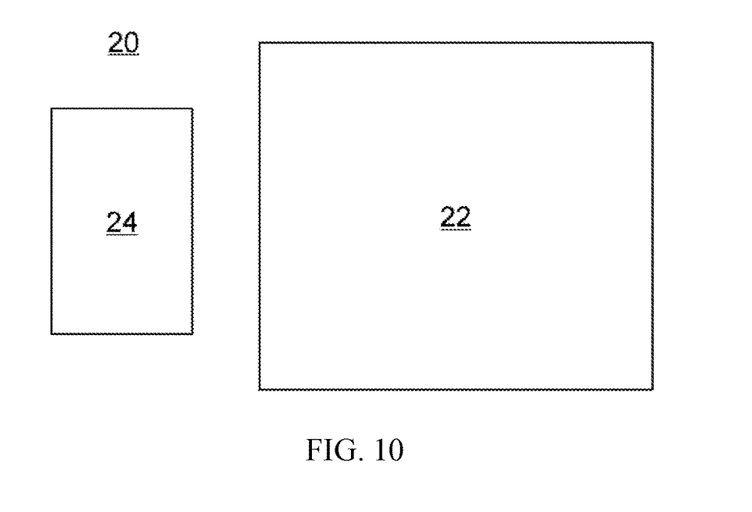
FIG. 10 is a block diagram of a display apparatus according to an embodiment of the present disclosure.

FIG. 10 is a block diagram of a display apparatus 20 according to an embodiment of the present disclosure. Referring to FIG. 10, the display apparatus 20 includes a display panel 22 which includes a plurality of display areas (not shown). The display panel 22 may be the display panel 10 described above with respect to FIG. 3. The display apparatus 20 further includes a driving circuit 24. The driving circuit 24 may be the driving circuit 100 or 200 described in the above embodiments, and thus will not be described here in detail.

By way of example, and not limitation, the display apparatus 20 may be a television screen, a monitor of a desktop computer, a monitor of a laptop computer, a touch screen, or any other component or product that can provide display functionality.

While several specific implementation details are contained in the above discussions, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Variations to the disclosed embodiments can be understood and effected by the skilled person in practicing the claimed subject matter, from a study of the drawings, the disclosure, and the appended claims. In the claims, the word "comprises" or "comprising" does not exclude other elements or steps, and the indefinite article "a" or "an" does not exclude a plurality. The term "plurality of" means two or more.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A driving circuit for a display panel, wherein the display panel has a plurality of display areas, the driving circuit comprising:
   a plurality of source drivers each configured to generate and supply grayscale voltages to a respective one of the plurality of display areas, the grayscale voltages being generated by use of a plurality of gamma voltages as reference voltages;
   a plurality of timing controllers each configured to control a respective one of the plurality of source drivers to generate and supply the grayscale voltages;
   a gamma voltage generation circuit configured to supply the plurality of gamma voltages to at least two of the plurality of source drivers, the gamma voltage generation circuit comprising a digital circuit portion and an analog circuit portion; and a first direct current (DC) power source for powering the gamma voltage generation circuit, the first DC power source comprising a single DC/DC converter for supplying DC voltages to both the digital circuit portion and the analog circuit portion of the gamma voltage generation circuit.

2. The driving circuit of claim 1, further comprising at least one second DC power source for powering the plurality of timing controllers.

3. The driving circuit of claim 2, wherein each of the plurality of timing controllers is configured to be powered by a respective one of the at least one second DC power source.

4. The driving circuit of claim 2, wherein at least two of the plurality of timing controllers are configured to be powered by one of the at least one second DC power source.

5. The driving circuit of claim 2, wherein the at least one second DC power source is further configured to power the plurality of source drivers.

6. The driving circuit of claim 5, wherein each of the plurality of source drivers comprises a digital circuit portion and an analog circuit portion, and wherein each of the at least one second DC power source comprises a single DC/DC converter for supplying DC voltages to a respective one or more of the plurality of timing controllers and both the digital circuit portion and the analog circuit portion of a respective one or more of the plurality of source drivers.

7. The driving circuit of claim 5, wherein each of the plurality of source drivers comprises a digital circuit portion and an analog circuit portion, and wherein each of the at least one second DC power source comprises two DC/DC converters, one of which being used for supplying DC voltages to a respective one or more of the plurality of timing controllers and the digital circuit portion of a respective one or more of the plurality of source drivers, the other one of which being used for supplying a DC voltage to the analog circuit portion of a respective one or more of the plurality of source drivers.

8. A display apparatus comprising the driving circuit as recited in claim 1.

9. A display apparatus comprising the driving circuit as recited in claim 2.

10. A display apparatus comprising the driving circuit as recited in claim 3.

11. A display apparatus comprising the driving circuit as recited in claim 4.

12. A display apparatus comprising the driving circuit as recited in claim 5.

13. A display apparatus comprising the driving circuit as recited in claim 6.

14. A display apparatus comprising the driving circuit as recited in claim 7.

15. A driving circuit for a display panel, wherein the display panel has a plurality of display areas, the driving circuit comprising:
a plurality of source drivers each configured to generate and supply grayscale voltages to a respective one of the plurality of display areas, the grayscale voltages being generated by use of a plurality of gamma voltages as reference voltages;
a plurality of timing controllers each configured to control a respective one of the plurality of source drivers to generate and supply respective ones of the grayscale voltages;
a gamma voltage generation circuit configured to supply the plurality of gamma voltages to at least two of the plurality of source drivers, the gamma voltage generation circuit comprising a digital circuit portion and an analog circuit portion; and
a first direct current (DC) power source for powering the gamma voltage generation circuit, the first DC power source comprising two DC/DC converters, one of which being used for supplying a first DC voltage to the digital circuit portion of the gamma voltage generation circuit, the other one of which being used for supplying a second DC voltage to the analog circuit portion of the gamma voltage generation circuit.

* * * * *